Dec. 17, 1968   M. R. DONNER   3,416,396
GUMMED LABEL STRIP PUNCH CUTTING MACHINE
Filed March 21, 1966   2 Sheets-Sheet 1

INVENTOR.
MARK R. DONNER
BY
Orland M. Christensen
ATTORNEY

Dec. 17, 1968   M. R. DONNER   3,416,396
GUMMED LABEL STRIP PUNCH CUTTING MACHINE
Filed March 21, 1966   2 Sheets-Sheet 2
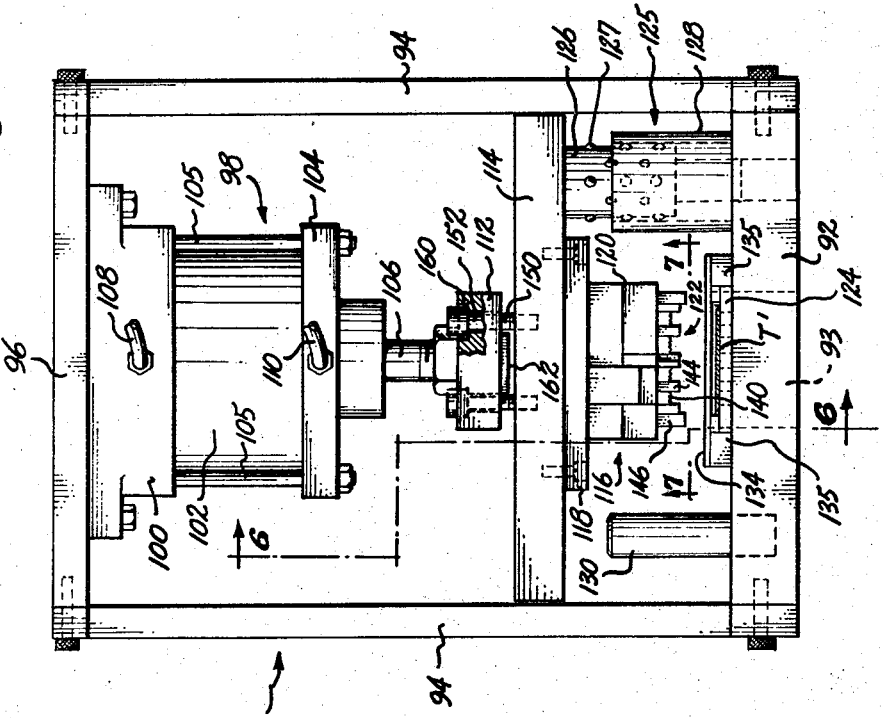
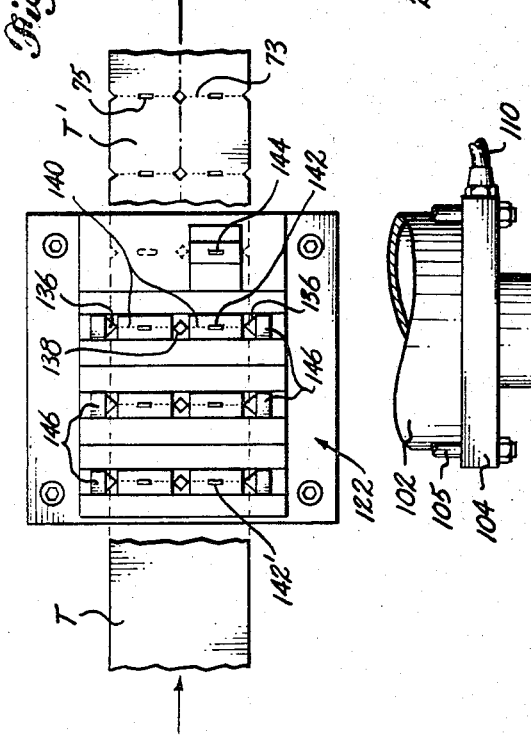
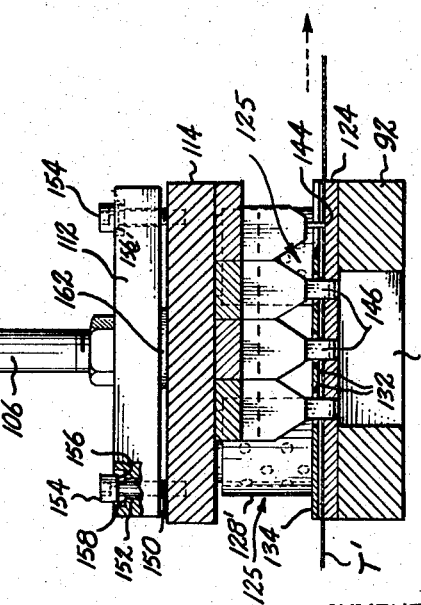
INVENTOR.
MARK R. DONNER
BY Orland M. Christensen
ATTORNEY … … …
United States Patent Office 3,416,396
Patented Dec. 17, 1968

3,416,396
GUMMED LABEL STRIP PUNCH CUTTING MACHINE
Mark R. Donner, Seattle, Wash., assignor to The Richmark Company, Seattle, Wash., a corporation of Washington
Filed Mar. 21, 1966, Ser. No. 535,869
6 Claims. (Cl. 83—9)

ABSTRACT OF THE DISCLOSURE

A machine for forming pre-gummed labels from pre-gummed paper is disclosed which includes improvements in the means for transmitting force from the drive means to the cutting elements. The improvements enable construction of the machine with closer tolerances between the stationary and movable cutting elements to substantially eliminate build-up of adhesive and cuttings between the cutting elements.

---

Figure 1:
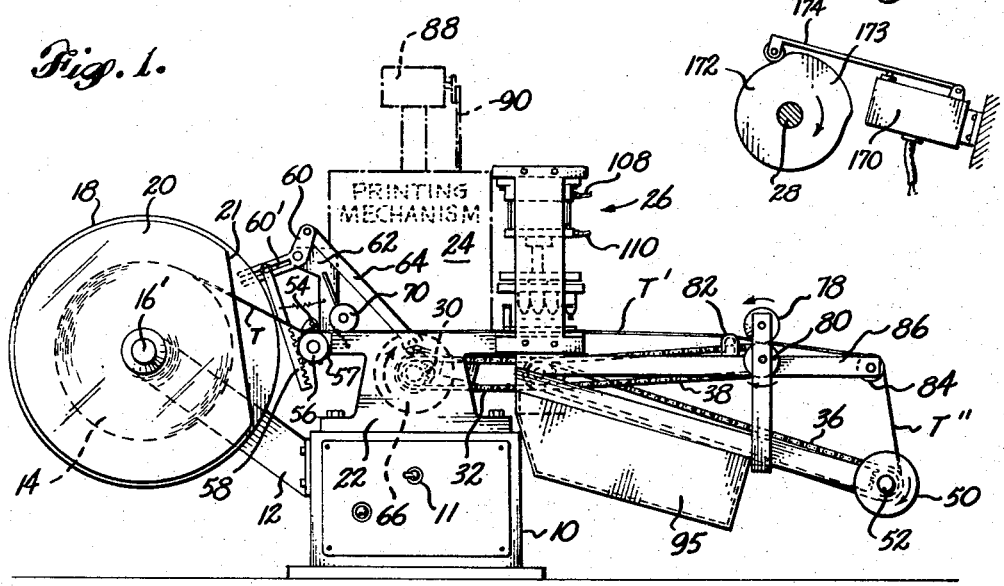

This invention relates to improved punch cutting mechanisms in machines for producing rolls or strips of printed gummed labels for commercial use in retail stores and the like. While the invention is described in terms of a preferred form thereof, it will be recognized by those skilled in the art that certain changes and modifications may be made without departing from the principal features involved.

In gummed label perforating or punch cutting machines a principal unsolved problem has been that the punch dies become gummed up by the tacky adhesive substance and cuttings during operation. Generally the dies are required to penetrate several layers of material, including a top layer suitable for printing, an adhesive layer, and a protective layer for the adhesive. Prior machines have suffered frequent breakdowns and have otherwise performed unsatisfactorily, usually because the tolerances in the cutting dies have been too great, leaving spaces in which adhesives and cuttings can accumulate and gum up the machine during the dwell time of the dies in cutting position prior to retraction. Attempts to reduce tolerances, and thereby reduce the accumulation of adhesive and cuttings in and around the dies have resulted in rapid wearing and chipping of the dies, requiring their frequent replacement and resulting in loss of operation time for repairs.

Attempts to increase speed of the punch cutting operation to reduce gumming have necessitated increasingly closer tolerances in operating or drive mechanisms, hence greater expense, and have not significantly reduced the problem of the wearing and chipping of dies.

Therefore, the principal objects of this invention are to provide improvements in gummed label punch cutting machines whereby the problem of gumming of punch and die elements by adhesives and cuttings is substantially alleviated; to provide improvements in such machines whereby closer tolerances between punch and die elements are possible, thereby reducing gumming and permitting greater accuracy and neatness in cutting and scoring the gummed label strips; to provide improvements whereby such a machine is rendered capable of producing pre-gummed labels at a faster rate than heretobefore possible; and to provide such improved machinery which is operable to produce rolls of pregummed labels adapted for use in existing price amount printing devices used by retail establishments to which the pregummed label rolls are sold.

The speed with which rolls of labels must be printed and punched in order to make their manufacture economically worthwhile requires that the drive means for the punch head be both powerful and fast and that the punch elements mesh accurately with the dies to prevent chipping and wear and frequent breakdowns. Past attempts to construct efficient, fast acting machinery of the required precision have resulted in huge, heavy equipment because of the requirement that the drive means maintain the punch elements in precise alignment with the die openings. Such equipment has been characterized by heavy framing carrying precision guide tracks for the punches and complicated alignment adjusting means, and by the concomitant necessity for frequent inspections, adjustments and machine stoppages.

Therefore, further objects hereof are to simplify such machines by providing light-weight, yet powerful drive means coupled to the punch head in a manner which permits simpler means for guiding the punch and die sets positively and accurately into registry and at greater velocity than heretofore possible, and otherwise to simplify such machinery in ways which reduce their weight and bulk, while increasing their rate of production.

These and other objects and purposes of the invention are achieved by provision of a combination of improvements presently to be described, in a perforating machine for perforating strips of pregummed paper to form pregummed labels. Such a machine normally incorporates means for holding a supply roll of pregummed tape, means for unwinding the tape from the roll, a cutting table across which the tape is passed and upon which perforating is performed, and means for rewinding the tape into finished rolls following its punching or perforation into a strip of labels. The improved combination includes means for advancing a strip of pregummed paper through the machine, stationary and movable cutting means positioned on opposite sides of the strip, respectively, and registrable with one another to perforate said strip to form separable labels; and drive means coupled with said advancing means for operating the cutting means. The drive means includes a drive member coupled to the movable cutting means, power delivery means operable to reciprocate the drive member alternately in cutting and retraction strokes, and a resilient coupling including a compressible medium between the power delivery means and the drive member for transmitting force therebetween. The drive means further includes a lost-motion coupling including first and second coupling elements each coupled with one of the power delivery means and the movable cutting means. One of these elements comprises stop means and the other comprises catch means engageable with the stop means during the retraction stroke to disengage the cutting means from each other following perforation.

The power delivery means preferably comprises a source of air under pressure and a drive cylinder including a compressed air enclosure, a drive piston comprising the drive member and slidable within the cylinder enclosure and dividing the enclosure into first and second air cavities on opposite sides thereof, and air control means operable in response to the advancing means to introduce air from the source into the cavities alternately for driving the piston in cutting and retraction strokes. The air in the first cavity thus comprises the aforementioned compressible medium.

In the preferred embodiment the movable cutting means includes a platen having perforating elements mounted thereon, the drive member includes a drive plate connected to the piston, and the coupling elements include connection pins mounted on either the plate or platen and extending to the other, the pins having stop portions thereon engageable with catch surfaces on the other of the plate and platen for limiting separation thereof during the retraction stroke.

The machine also includes post members mounted rigidly with respect to the stationary cutting means and with which the platen is engageable to terminate the downstroke thereof following registration of the movable cutting means with the stationary cutting means. The post members are thereby operable to support the platen during commencement of the retraction stroke of the piston until engagement of the connection pin stop portions and the catch means causes retraction of the platen therefrom.

Precision ball bearing guide means are also included, comprising a first member mounted rigidly with the stationary cutting means and a second member mounted rigidly upon the platen. One of the first and second members comprises a tubular member having its axis parallel to the required path of the movable cutting means and the other comprises a post member axially aligned with the tubular member and slidable therein during cutting and retraction strokes. The post member has a plurality of sockets therein distributed substantially uniformly over its surface, each having a rotatable bearing mounted therein and engageable with the inside surface of the tubular member to guide the platen along its required path.

In the illustrated embodiment the advancing means advances the strip intermittently, and an air valve connects the source of air to the second air cavity during advance of the strip and between advances of the strip connects it first to the first air cavity for the cutting stroke, then to the second air cavity for the retraction stroke.

In order to form a plurality of label rolls simultaneously in the machine the advancing means is adapted to accommodate a pregummed paper strip of width sufficient to form a plurality of strips of labels. The movable cutting means includes a plurality of sets of perforating elements arranged in rows and columns across and along the length of the strip whereby to form rows and columns of labels across and along the strip on each cutting stroke. Strip splitting means are provided, located between the cutting means and the winding means to split the strip into separate strips of labels after perforation thereof. Adjacent sets of perforating elements across the width of the strip then include at least one perforating element in common, each positioned to form notches which become edge notches for two adjacent rows of labels when split.

These and other features, objects and advantages of the invention will become more apparent from the following detailed description taken in connection with the accompanying drawings showing the preferred embodiment of the invention.

Figure 2:
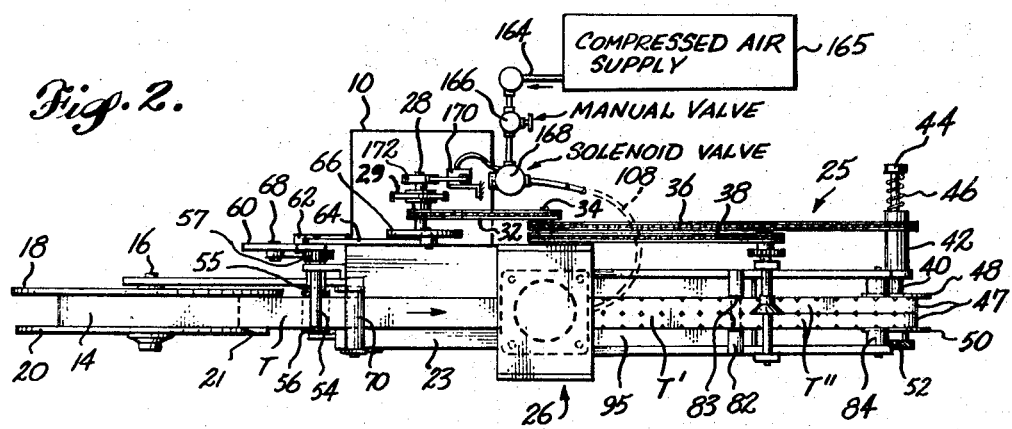
Figure 4:
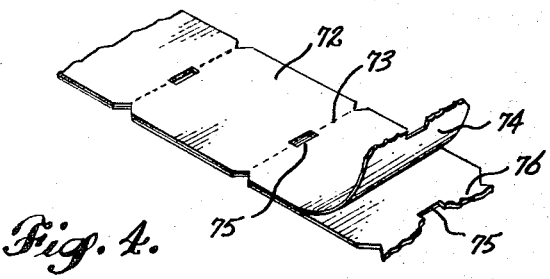

FIGURE 1 is a side view of a gummed label printing and punch cutting machine including improvements according to the invention; FIGURE 2 is a top view of the machine illustrated in FIGURE 1; FIGURE 3 is a portion of a cam and microswitch assembly forming a part of the machine in FIGURES 1 and 2; and FIGURE 4 is a fragmented isometric view of a portion of the completed strip of pregummed labels made in the machine of FIGURES 1 and 2.

FIGURE 5 is an elevational view of an improved punch cutting assembly according to the invention, taken in a direction endwise of the machine in FIGURES 1 and 2; FIGURE 6 is a fragmented and partially cross-sectional view of the improved punch cutting assembly, taken on lines 6—6 of FIGURE 5; and FIGURE 7 is a bottom view, taken on lines 7—7 in FIGURE 5, of the punch elements, with fragmented portions of a pregummed tape superimposed thereon to show the positional relationship of the punch elements with respect to the tape.

The machine illustrated in FIGURES 1 and 2 is modified according to the invention from a well known type of gummed label printing machine operable to print labels from a supply roll of paper tape and rewind the strips of labels on smaller marketable rolls which are then sold to retail stores for marking of prices thereon and application to merchandise. Typically, this machine is approximately four feet long and two feet high and includes a flanged base section 10 which encloses an electric motor turned on and off by a switch 11 and from which the machine is operated. The base section 10 supports an arm 12 carrying a supply roll 14 of pregummed paper tape rotatably mounted upon a shaft 16 between a stationary disk 18 and a transparent disk 20 removable by unscrewing tap 16' and through which the supply roll may be seen. Disk 20 has a portion thereof cut away along a chord line 21 for ease of accessibility to the pregummed tape T as it is fed from the roll.

Mounted on top of the base portion 10 is a T-shaped frame 22, which supports tape advance drive means 25 and label punch cutting mechanism 26 presenlty to be described, as well as a suitable label printing mechanism 24 positioned directly above table 23. The details of the printing mechanism are not important to this invention, and hence need not be described.

Tape drive means 25 derives its power from rotatable drive shaft 28 mounted on the base 10 and having a belt drive connection 29 to the electric motor (not shown) housed within base 10. A sprocket 30 mounted on shaft 28 drives a chain 32 which turns a second shaft 34 upon which are mounted additional sprocket wheels driving first and second chains 36 and 38. Chain 36 provides the main rewind drive for the punched and printed tape T' (printing not shown) by driving a rewind shaft 40 through a slip clutch assembly 42 adjustable by means of a screw 44 operable to tighten the clutch spring 46 mounted thereon. The rewind shaft 40 carries a rewind roll assembly consisting of stationary rim 48 and removable rim 50 holding a pair of rewind rolls 47 therebetween. The latter disk 50 may be detached by unthreading a tap 52 to remove the rewind rolls when they reach their capacity of printed and punched pregummed labels. The slip clutch assembly 42 limits the drive tension force applied to the tape T' to an amount less than its break-point tensile strength (after perforation), pulling it through the machine as the rewind roll is driven in a clockwise direction as shown.

While substantially constant tension is maintained on the tape at rewind rolls 47, its intermittent advances through the machine are controlled primarily by the unwind drive roller 56 which draws the unprinted and unpunched, pregummed tape T from the supply roll 14. This roller is frictionally mounted upon its axis so as not to turn counterclockwise, and to turn clockwise only intermittently when rotated through a slip-clutch connection 55 by a rack and pinion assembly consisting of pinion 57 and rack 58. The rack is reciprocated through a bell crank 60 mounted upon support bracket 62 and rotated back and forth by rocker arm 64 eccentrically connected at its lower end to rotatable disk 66 mounted on drive shaft 28. Clutch 55 between pinion 57 and rolls 56 alternately turns roller 56 to advance the tape on the upstroke of the rack, and releases and slips on the downstroke thereof. During the down-stroke of the rack the roller 56 remains stationary due to its frictional mounting (or a rachet may be provided) and the tape T is prevented from advancing by braking friction applied there to between roller 56 and the opposing pressure element 54.

The distance of advance of the tape in each cycle may be adjusted by positioning the upper end of the rack 58 within the slot 60' in the left-hand arm of the bell crank 60. An additional tape contact roller 70 is provided to hold the tape T firmly against the printing table 23.

Printing of the tape T is synchronized with the punch cutting operation so that the printed words thereon (not shown) are properly located within each square between perforation lines 73 (FIGURE 4). Typically, three labels along the length of the tape are printed simultaneously, and punch cutting mechanism 26 perforates and scores the tape to produce three labels along its length. Improvements provided by this invention also permit a plurality of labels laterally of the tape to be produced. Thus, the width of supply roll 14 is, in the illustrated case, twice the width of the labels to be produced, so that six labels are printed and punched in each cycle of the machine.

Supply roll 14 is premanufactured for use in making rolls of labels such as those illustrated in FIGURE 4, consisting of an upper paper layer 72 of paper suitable for printing whose under surface 74 is coated with a pressure adhesive and covered with a masking layer of protective paper 76. As the printed tape T passes through the punch cutting assembly 26 it is punched and scored along lines 73 to form label sections of double width, and travels on to be split along its centerline into two label strips each of single-label width. The splitting operation is performed by a pair of cutting wheels 78 and 80 of conical shape having their apexes facing in opposite directions and their base edges overlapping slightly to act as continuously operable scissors cutting transversely of the plane of the tape. Cutting wheel 80 is mounted to rotate freely upon its axis and is driven by frictional contact with cutting wheel 78, which is in turn driven by sprocket chain 38, as seen in FIGURE 2. Continuous rotation of the cutting wheels provides positive cutting action at all times so as to provide minimum interference with travel of the tape through the machine and to safeguard against occurrence of an inertial peak force after each advance of the tape which would tend to break it.

Guide means 82, having shoulders 83 engaging the opposite edges of the perforated tape T', assures that it is cut precisely in the center. The separate label strips T'' then pass across an additional roller 84 mounted to rotate freely upon the frame 86, before passing onto the rewind rolls 47. A counter 88 operating upon each stroke of printing apparatus 24 through a suitable connection 90 is gauged to ring a bell (not shown) when enough labels have been printed to fill one pair of rolls 47 of printed labels, whereupon the operator replaces the filled rolls with new cardboard or plastic center rims upon which new rolls may be wound.

The principal problem sought to be solved by this invention is that of accurately punching the gummed labels without interference or plugging by adhesive and cuttings. The improved punch cutting assembly 26 includes features according to this invention which have been found to solve that problem and others previously mentioned. The assembly is supported upon frame 22 of the machine and includes a base plate 92 and a pair of upright side members 94 secured thereto which in turn support the upper frame member 96.

The latter member carries an air cylinder 98 consisting of base bracket 100 secured to upper frame member 96, the piston cylinder 102 held by assembly bolts 105 between base member 100 and end plate 104 and within which an air-operated piston (not shown) is encased. The latter reciprocates piston rod 106 in response to alternate applications of compressed air to opposite displacement cavities therein through down-stroke hose connection 108 and up-stroke hose connection 110. Rigidly connected to piston rod 106 is a drive plate 112 to which the punch headplate or platen 114 is connected by a lost-motion connection later described. Mounted on the under side of the platen 114 is punch element assembly 116 comprising a base portion 118 carrying punch elements 122 which mesh with die openings in die plate 124 mounted on base plate 92 of the frame.

Punch elements 122 are guided into registry with the female die openings in plate 124 partly by two precision ball bearing guide assemblies 125, each consisting of a cylindrical guide post 126 rigidly connected to platen 114 and carrying ball bearings 127 rotatably mounted in sockets therein, and guide cylinder 128 mounted rigidly upon base member 92 of the frame. Guide post 126 moves smoothly within guide cylinder 128 while permitting only an extremely limited amount of lateral "play" between the platen 114 and base plate 92. Such precision guide assemblies are well known in the art. Any equivalent precision guide means meeting the tolerance requirements might be used, but this particular type has been found most useful.

Also mounted upon base plate 92 of the frame is a stop post 130 of accurately gauged height to limit the downward motion of the punch head assembly. As the latter is driven downward by the air cylinder, punch elements 122 pass first through slots 132 in guard plate 134 mounted upon risers 135 and beneath which printed tape T' passes. Guard plate 134 serves to hold the tape down upon the retraction stroke of the punch elements and includes projections engaging the edges of the tape to limit its lateral movement to guide the tape accurately beneath the punch elements. A slot 93 is included beneath the female die openings in the die plate 124 to receive tape cuttings which drop into a bin 95 beneath the machine frame.

The three sets of punch elements 122 (FIGURE 7) each include outside triangular punches 136 and a center diamond-shaped punch 138 designed to remove triangular pieces from the tape at opposite edges and the center thereof, respectively, so as to form angulated notches at the edges of both strips of labels. These are in line with perforations 73 formed by teeth 140, and with rectangular notches 75 formed by rectangular punch elements 142. Stop post 130 holds the platen 114 at a height whereby teeth 140 perforate only the top layer of paper 74 (FIGURE 4) and not protective masking layer 76 covering the adhesive surface, while longer punch elements 142 punch through both layers for complete removal of the cuttings. Rectangular notches 75 in the middle of each label strip serve the purpose, along with the triangular notches at the edges, of weakening the tape so it will tear readily on the perforation line, and the additional purpose of cooperating with a registering tooth of existing price amount printing machines by which the labels are marked for application to merchandise in the chain stores and the like which use them. The rectangular hole 75 also serves as a referencing device in the present machine to assure that spacing between perforation lines is always constant. In this latter regard an indexing or referencing punch 144 is included in the punch head assembly and enters the pre-punched hole made by punch element 142' after each advance of the tape. By periodic checks the operator can determine that everything is indexing properly if this referencing punch 144 does not increase the size of the rectangular holes.

Included in the punch element assembly are laterally spaced pre-registry guide punches 146 which are spaced laterally beyond the edges of the paper tape T, but extend farther down than the tape perforating punch elements whereby they register with corresponding openings in the die plate 124 prior to tape contact of perforating punch elements 122. These auxiliary elements are not essential to operation of the machine, but they do serve as further guides in addition to the precision ball bearing guide assemblies 125, assuring perfect registry of punch elements and dies. They also serve as supports for triangular punches 136 to compensate for the unbalanced loads thereon due to their overlap of the tape edges.

The lost-motion coupling between drive plate 112 and platen 114 consists of connection pins 150 rigidly threaded into platen 114 and extending through slightly oversize receiving holes 152 in drive plate 112 and having stop means thereon in the form of round heads which bottom on the retraction stroke with catch surfaces 158 countersunk in the drive plate 112. A pad 162 of Micarta or other hard, resilient cushion material is secured centrally upon the under surface of drive plate 112 to cushion the hammer blow contact between the plates on the down-stroke, and to provide flexibility permitting angulation between the drive plate and platen during application of cutting force.

In operation, the punch head is initially in its raised or retracted position shown in FIGURE 5, suspended from the drive head by means of connection pins 152. Down-stroke power is supplied from a source of compressed air 165 (FIGURE 2) through supply line 164 (with manually operated valve 166 open) to a solenoid valve 168 having dual outlets (not shown) connected to hoses 108 and 110 and operated electrically from impulses supplied by a microswitch 170. The latter is controlled by a cam 172 mounted on drive shaft 28 and having a nub or projecting portion 173 thereon operable to lift the actuating arm 174 of the microswitch to turn it on during approximately ¼ of the machine's cycle. When arm 174 is lifted the microswitch operates solenoid valve 168 to supply compressed air through supply line 108 to the upper cavity of the drive cylinder 102, driving piston rod 106 down. When arm 174 is then dropped by the cam to its former position, the microswitch operates the solenoid valve to suuply air through supply line 110 to the lower cylinder cavity, retracting the drive head in its upper position shown in FIGURE 5.

Downward thrust of the piston brings drive head 112 into abrupt contact with platen 114, and the punch head assembly is guided in its downward path, first by precision ball bearing guide assemblies 125, then by pre-registry elements 146, until punch elements 122 have punched and scored the tape and platen 114 has bottomed on stop posts 130. The fact that a captivated volume of air in the cylinder cavity is interposed between the prime mover (the compressed air supply 165) and the punch elements affords important cushioning and flexibility upon impact with the tape and stop posts.

On the retraction stroke as air pressure is applied through supply line 110, the piston and drive 112 begin their upward path from the position shown in FIGURE 6. Because of the lost-motion coupling, which allows approximately ³⁄₁₆ of an inch of separation of stop means 156 and catch surfaces 158 in the drive plate 112, the piston and drive head gain some momentum before the stop means bottom with hammer blow abruptness in the drive plate, yanking the punch elements from any frictional grip by the dies.

The machine reciprocates roughly 72 times per minute, and the cam projection 173 is of a length whereby each down-stroke retraction-stroke cycle consumes about one-fourth of the machine's cycle, or about ¹⁄₂₀ of a second. It can produce nearly 26,000 labels per hour.

Clearances between the punch elements and die openings are of the order of 0.0002 of an inch or less. This compares with a total label thickness of 0.0065 of an inch, which is made up of 0.002 of an inch thickness in the protective masking layer 76, 0.0015 of an inch thickness in the adhesive layer, and 0.003 of an inch in the label paper 72 without the adhesive. These extremely fine tolerances between the punch and die elements virtually eliminate space for buildup of adhesive or cuttings therebetween.

The air cylinder drive means mounted directly overhead and applying force directly in line with the path of the punch element provides a much simpler and lighter drive means than mechanical drive means previously used, and is found to operate successfully for much longer periods of time with less wear and chipping of the punch and die elements.

The lost-motion coupling not only provides important flexibility between the drive plate 112 and the platen 114 at the moment of impact and permits inertia buildup on the retraction stroke, but also eliminates necessity for precise mounting of the drive cylinder means to assure accurate alignment of its axis with the necessary path of the punch elements.

Other features, objects and advantages of the construction will be recognized by those skilled in the art.

I claim as my invention:

1. A machine for forming pregummed labels from pregummed paper, comprising:
   (1) means for advancing a strip of pregummed paper through said machine;
   (2) stationary and movable cutting elements positioned on opposite sides of said strip, respectively, and registrable with one another to cut said strip to form separable labels;
   (3) pneumatic power delivery means for said movable cutting elements, including
      (a) a drive cylinder having a piston therein and
      (b) means for delivering compressed air alternately to opposite sides of said piston in timed relation with said advancing means to drive said piston in cutting and retraction strokes;
   (4) a lost-motion coupling between said piston and said movable cutting elements, including
      (a) a platen supporting said movable cutting elements,
      (b) a drive plate connected to said piston,
      (c) connection members mounted on one of said plate and platen and extending to the other, said connection members having stop portions thereon and the other of said plate and platen having catch surfaces thereon engageable by said stop portions and positioned relative thereto to limit separation of said plate and platen during the retraction stroke, and
      (d) force transmitting means positioned between said drive plate and said platen and operable to permit relative angulation therebetween during application of cutting force to said cutting elements; and
   (5) guide means including first and second guide members coupled respectively with said stationary cutting elements and said platen and cooperable to guide said cutting elements into registry during application of cutting force to said cutting elements.

2. The machine defined in claim 1 wherein said strip comprises a layer of label paper, an adhesive coating on one side of said label paper, and a protective masking layer over said adhesive, and wherein said cutting elements comprise first elements adapted to perforate said layers and second elements adapted to score said label paper without cutting said masking layer.

3. The machine defined in claim 1 wherein said machine includes post members mounted rigidly with respect to said stationary cutting elements and with which said platen is engageable to terminate the downstroke thereof following registration of the cutting elements, said post members being operable to support said platen during commencement of the retraction stroke of said piston until said lost-motion coupling causes retraction of said platen therefrom.

4. The machine defined in claim 3 wherein one of said first and second guide members comprises a tubular member mounted rigidly with said guide elements and having its axis parallel to the required path of the movable cutting elements and the other of said first and second guide members comprises a post member axially aligned with said tubular member and slidable therein during said cutting and retraction strokes, said post member having a plurality of sockets therein distributed substantially uniformly over the surface thereof and each having a rotatable bearing mounted therein and engageable with the inside surface of said tubular member to guide said platen along said path.

5. The machine defined in claim 1 wherein said advancing means includes supply means for delivering the strip of pregummed paper to said machine, and means for winding completed strips of pregummed labels on rolls, said advancing means being adapted to accommodate a pregummed paper strip of width sufficient to form a plurality of strips of labels simultaneously, said cutting elements including a plurality of sets of perforating elements arranged in rows and columns across said strip and along the length thereof whereby to form simultaneously a plurality of rows and columns of labels across and along said strip on each cutting stroke, and strip splitting means between said cutting elements and said winding means and operable to split said strip into separate strips of labels after perforation thereof.

6. The machine defined in claim 5 wherein adjacent sets of perforating elements across the width of said strip include at least one perforating element in common, each positioned to form notches comprising edge notches for two adjacent rows of labels when split.

References Cited

UNITED STATES PATENTS

| | | | |
|---|---|---|---|
| 786,504 | 4/1905 | Lewis | 83—620 X |
| 1,256,658 | 2/1918 | Cameron et al. | 83—408 X |
| 1,504,182 | 8/1924 | Carter | 83—616 |
| 1,736,049 | 11/1929 | Norden Dale | 83—440 |
| 1,866,711 | 7/1932 | Jones | 83—449 X |
| 2,000,536 | 5/1935 | Poeppelmeier | 83—258 X |
| 2,068,456 | 1/1937 | Hooper | 83—2 X |
| 2,136,521 | 11/1938 | Petskeyes | 83—258 X |
| 2,823,960 | 2/1958 | Blazek et al. | 83—637 X |
| 3,176,569 | 4/1965 | Daniels | 83—639 X |
| 3,255,649 | 6/1966 | Buttery | 83—9 |

ANDREW R. JUHASZ, *Primary Examiner.*

U.S. Cl. X.R.

83—214, 616, 620, 639, 408, 637